Sept. 23, 1969          D. R. JONES ET AL          3,468,327
                  CORE BLEED FOR VORTEX READOUT DEVICE
Filed July 29, 1965                              2 Sheets-Sheet 1

INVENTORS
DONNIE ROLAND JONES &
EDWIN U. SOWERS, III

*Hurvitz & Rose*

ATTORNEYS

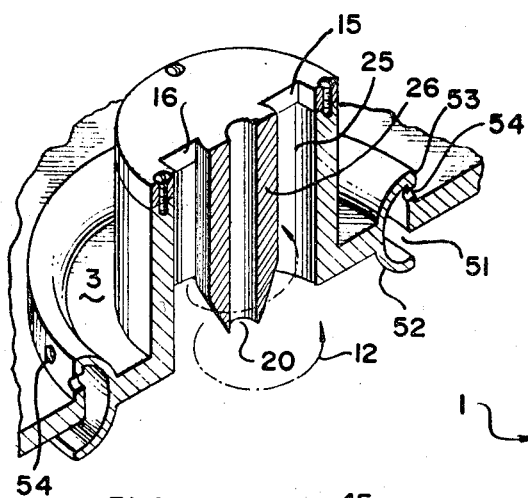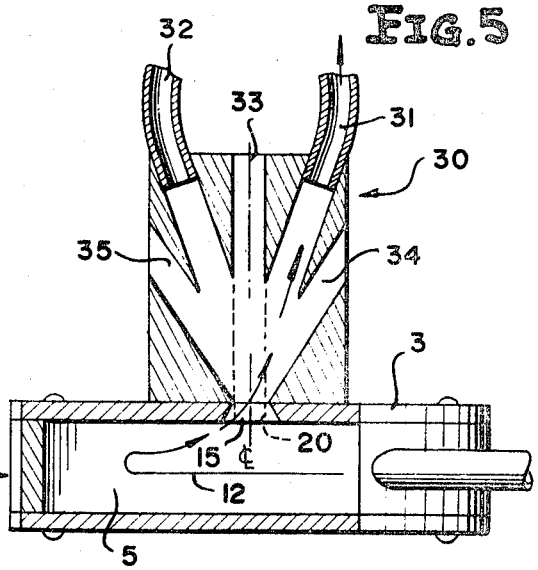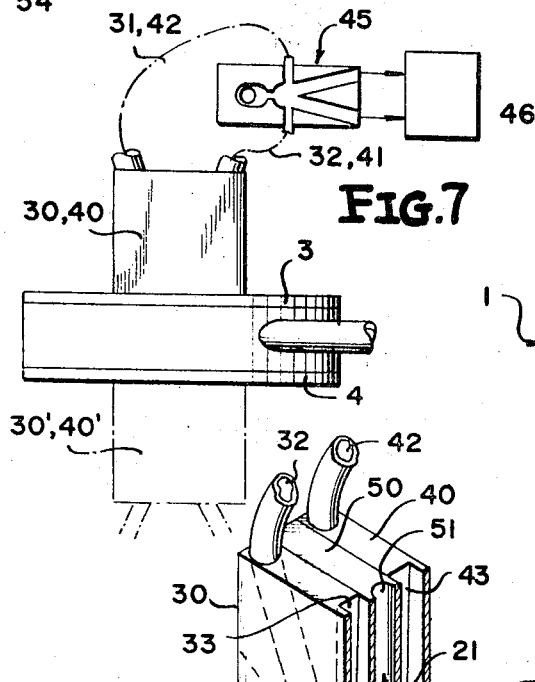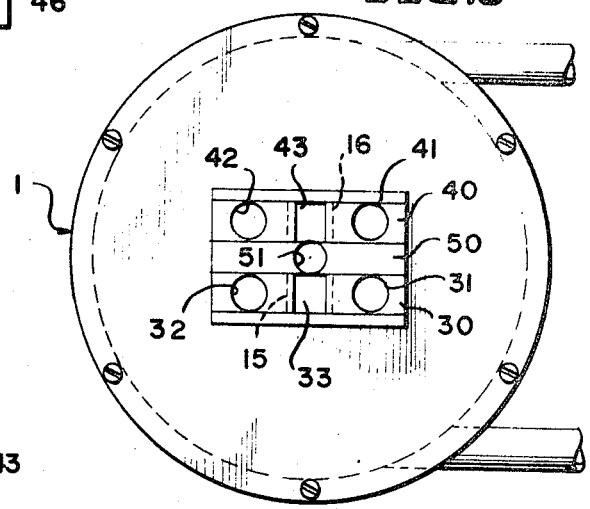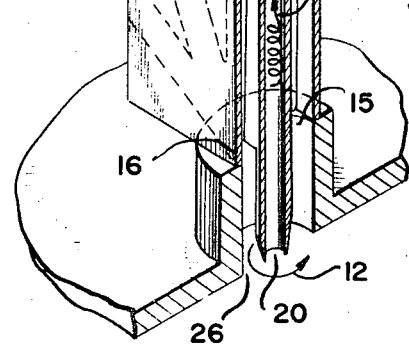

3,468,327
CORE BLEED FOR VORTEX READOUT DEVICE
Donnie Roland Jones and Edwin U. Sowers III, Silver Spring, Md., assignors to Bowles Engineering Corporation, Silver Spring, Md., a corporation of Maryland
Filed July 29, 1965, Ser. No. 475,816
Int. Cl. F15c 1/16
U.S. Cl. 137—81.5                                    12 Claims

ABSTRACT OF THE DISCLOSURE

The fluid core at the egress orifice of a vortex amplifier is diverted from the readout channel to improve signal-to-noise ratio and reduce signal averaging.

---

The present invention relates to readout devices for vortex amplifiers having an improved signal-to-noise ratio and, more particularly, to a readout device for vortex amplifiers having a centrally located relief or by-pass orifice for eliminating a source of noise at the egress orifice of the vortex amplifier resulting from a small central core of fluid which exhibits solid body rotation rather than free vortex rotation.

A vortex amplifier in its simplest construction may comprise a substantially hollow cylindrical chamber and a pair of end walls for enclosing the chamber. In one type of readout device for a vortex amplifier, an output orifice is formed in one or both of the end walls adjacent the axis of symmetry of the cylindrical chamber, as described in a co-pending case entitled "Readout for Vortex Amplifier," Ser. No. 301,868, filed Aug. 13, 1963, now Patent No. 3,272,213, patented Sept. 13, 1966. The output orifice is located on a diameter of the chamber at a location adjacent the center thereof. As a result of the vortical flow induced in the chamber, for instance, adjacent its periphery, the rotational velocity of the fluid at the output orifice is many times greater than and thus represent a gain over the rotational velocity of the fluid adjacent the outer periphery of the chamber. In general, the former rotational velocity is greater by a ratio of the radius of the chamber to the radius of the location of the output orifice. Thus, when rotational flow is induced in the chamber by some means, such as a fluid input signal applied at the periphery of the chamber, the rotational velocity of the fluid exiting from the output or egress orifice has been amplified by the aforesaid gain ratio. It follows that by measuring the velocity of the output signal by suitable means described in the aforementioned co-pending case, an indication of the rotational velocity of said input signal is obtained.

Difficulty is experienced with prior art vortex devices due to the relatively large noise signals developed in such devices, resulting in low signal-to-noise ratios. In a vortex chamber a core of fluid adjacent the axis of the egress orifice exhibits solid body rotation. Solid body rotation is wheel-type rotation having a constant angular velocity. The core itself is not noisy and as such does not introduce noise into the system but it has been determined that the position of the core is highly unstable and its movements relative to the axis of the egress orifice do introduce a considerable amount of noise into the system.

An important feature of the present invention is the discovery that the position of the core may be stabilized by providing a core bleed coaxial with the egress orifice.

The core bleed may be a passage, generally circular, which extracts a predetermined portion of the fluid subsisting along the axis of the egress orifice, so that this fluid is provided an egress path isolated from the path provided for the remainder of the egressing fluid. It has been determined that such an arrangement stabilizes the position of the core, thus reducing total noise of the system and increasing the signal-to-noise ratio.

The utilization of the core bleed further enhances the signal-to-noise ratio of the system by reducing the averaging effect of the fluid in the core on the available signal. In solid body rotation the rotational velocity of the fluid decreases as a linear function of decreasing radius to a theoretical zero value. Thus, if all of the fluid in the core is retained in the system it produces a considerable reduction in the signal level thus reducing the signal-to-noise ratio.

The use of the core bleed not only extracts a portion of the core fluid from the system thus reducing its averaging effect on the signal but the core bleed extracts that portion of the core having the lowest velocities; that is, the portion of the core lying along and immediately adjacent the axis of the egress orifice. Thus the averaging effect is minimized.

The size of the core bleed is determined by the minimum signal desired to be detected and the Reynolds number of the fluid. It is apparent that in the absence of rotation no core is formed. However, as soon as a signal is introduced which produces rotation of fluid, the core forms. The core size is a function of the kinematic viscosity of the fluid which is itself a function of velocity of the fluid and its Reynolds number. As the rotating fluid in a vortex chamber approaches the center of the chamber its rate of rotation, and therefore velocity, increases towards a theoretical value of infinity at zero radius of the chamber. Well prior to attainment of such a theoretical value, the kinematic viscosity of the fluid becomes such that solid body rotation results. Thus the size of the core is determined by the radial location at which the fluid achieves a velocity such that its kinematic viscosity is of sufficient value to produce solid body rotation. Now, if a minimum signal level is determined for the system, the radius of the core bleed is preferably made equal to the radius of the core at the selected signal level. As a result the core has no averaging effect on the minimum output signal which is obviously a very desirable result. As the signal level increases, the core bleed cannot accommodate all of the core. However only the highest velocity portions of the core pass into the remainder of the system so that in all instances the averaging effect of the core is reduced well below the averaging effect of the core in the prior art systems.

With respect to stabilizing the core position, the fact that the radius of the core exceeds the radius of the core bleed does not appear to have an appreciable effect on the stabilizing function of the core bleed.

The core bleed or relief orifice described above is applicable to all readout systems for vortex amplifiers and its use is not limited to any particular type. However for purposes of example only, the vortex amplifier is illustrated as employing a particular type of readout device as described and claimed in co-pending patent application Ser. No. 417,850 filed on Dec. 9, 1964 in the name of Donnie Roland Jones for "Readout Device for Vortex Amplifiers" and assigned to the same assignee as the present invention. In the co-pending application the vortex amplifier is not provided with the usual symmetrical egress orifice. Instead the vortex device has two rectangular slots located adjacent the center of the vortex chamber with the major axis of the slots aligned with a common diameter of the chamber on opposite sides of the center thereof. The fluid flowing through these slots is parallel to the axis of the chamber in the absence of rotational flow. If the fluid in the chamber rotates the fluid egressing through the slots is inclined to the non-rotational path by an angle which has a sense of magnitude that is a function of the direction and rate of rotation of fluid in the chamber. Measurements of these angles provide a measurement of output signal level.

In such a system, the rectangular slots provide the only means for escape of the solid body core of the unit. The core does not flow equally to one or the other of the slots but switches rather randomly between the two slots thereby introducing considerable noise into the system.

It has been found that the core bleed or relief orifice described above provides the same advantages in this latter type of system as in the more conventional types of readout devices discussed previously. Thus switching of the core between the readout slots, with the noise inherent in such switching, is completely eliminated.

It is a further object of the present invention to provide a centrally located core bleed for vortex devices to increase the average velocity of the output flow or signal of the system, thereby increasing the output signal level.

It is still a further object of the present invention to provide a vortex amplifier with a centrally located core bleed designed to improve the signal-to-noise ratio of the system.

It is yet another object of the present invention to provide a centrally located fluid core bleed pipe for fluid vortex amplifiers that is wedge-shaped so as to improve the output signal level.

The above and still further objects, features and advantages of the present invention will become apparent upon consideration of the following detailed description of one specific embodiment thereof, especially when taken in conjunction with the accompanying drawings, wherein:

FIGURE 4 is a cross-sectional view in elevation of a modification of the embodiment shown in FIGURE 3;

FIGURE 5 is a partial cross-sectional view of the vortex device constructed in accordance with the present invention in combination with a signal measuring unit;

FIGURE 6 illustrates a top view of the vortex device and measuring unit of FIGURE 5;

FIGURE 7 illustrates a pure fluid amplifier under the control of the measuring unit of FIGURES 5 and 6; and FIGURE 8 illustrates a cross-section view of the embodiment shown in FIGURE 4 in combination with a measuring unit, also in cross section.

Figure 1:
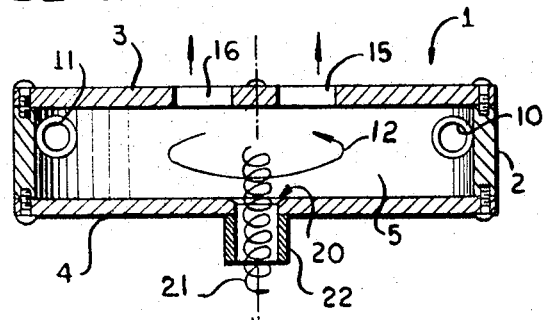
FIGURE 1 illustrates a cross-sectional view of one form of the vortex device utilizing the arrangement of the present invention.

Referring now specifically to FIGURE 1 of the accompanying drawings, there is illustrated one embodiment of the present invention wherein vortical fluid flow is utilized for amplifying fluid signals. There is shown a cross-sectional view of a fluid vortex amplifier, generally designated by the reference numeral 1, having a cylindrical wall 2, which in combination with upper end wall 3 and lower end wall 4 form a generally cylindrical vortex chamber, designated by the reference numeral 5. The cylindrical wall 2 has, for purposes of illustration of the operation of the device, a pair of input orifices 10, 11 formed therein for the introduction of differentially related tangential fluid streams into the system from suitable pressure sources 10a, 11a, respectively.

Fluid enters the system at either or both of the input orifices 10 and 11 along the outer periphery of the chamber 5. As is conventional in vortex amplifier flow, a tangential control flow egressing from these orifices 10, 11 imparts a rotational component to the flow in the chamber 5 in either a clockwise or counterclockwise direction, depending on which of the control signals from the orifices 10, 11 predominates. For purposes of illustration, let it be assumed that the control signal flow from the orifice 11 predominates, thereby imparting a generally counterclockwise rotation to the fluid in the system, as generally indicated by the rotational flow arrow 12 in FIGURE 1. As the combined flows from the orifices 10, 11 pass into the vortex chamber 5, conservation of momentum requires that the tangential velocity of the angular velocity both increase as the flow moves inward with decreasing radius. These velocity increases cause shear stresses in the rotating fluid mass, which forces increase very substantially as the fluid moves toward the axis of symmetry of the amplifier 1. As previously indicated, at the extreme velocities that occur along the axis of symmetry, the vortex flow is no longer free to increase in velocity with a decrease in radius because of the high viscous coupling that has been found to occur along this central core of the rotating mass. This high viscous coupling, kinematic viscosity, causes the fluid particles to be held together with great force so that a constant angular rate of rotation occurs which will hereinafter be referred to as solid body rotation since the performance of the fluid at this point is analogous to a solid body.

Figure 2:
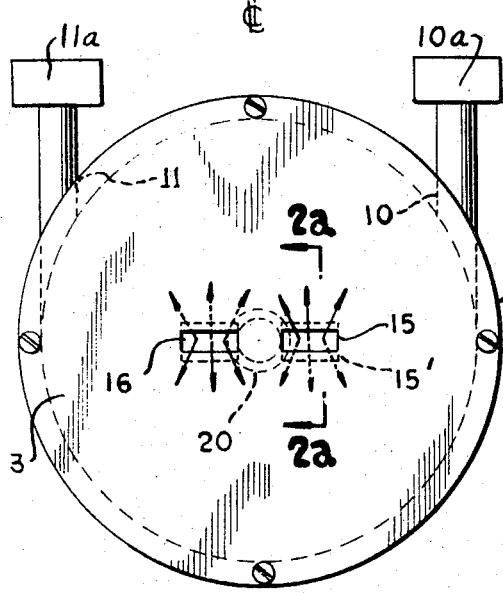
FIGURE 2 illustrates a top view of the device of FIGURE 1.

It will be remembered that the main purpose of any fluid vortex amplifier is to obtain an output signal that is amplified in proportion to the ratio between the radial location of the input orifices 10 and 11 along the periphery and the radial location of output orifices 15 and 16, as illustrated in FIGURES 1 and 2. As best illustrated in FIGURE 2, the rotational flow within the vortex chamber 5 is converted to generally linear flow as it passes through the output orifices 15 and 16, as indicated by the flow arrows in the figure. In the assumed case of predominant counterclockwise flow, as illustrated by the flow arrow 12 in FIGURE 1, the output signal flow from the orifices 15 and 16 assumes the orientation and direction represented by the solid flow arrows of FIGURE 2.

Figure 2B:
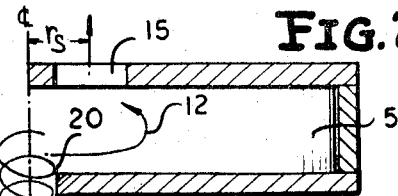
FIGURE 2b is a graphical illustration of the rotational velocity profile of different Reynolds numbers and the locus of $U_{max}$ and $r_{max}$.
Figure 2A:
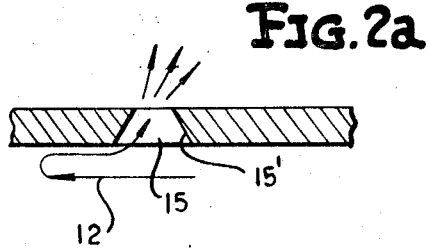
FIGURE 2a illustrates a cross-sectional view along line 2a—2a of FIGURE 2.

This conversion of rotational flow to generally linear flow through the orifices 15 and 16 can be better understood by referring to FIGURE 2a, which illustrates a partial cross-sectional view of the upper end wall 3 across the output orifice 15. As indicated, opposing walls of the orifice 15, indicated by the reference numeral 15′, are in opposing relationship to the rotational flow which in the case selected is represented by the counterclockwise flow arrow 12, so that the flow will be induced to egress from the orifices 15 and 16 in the manner indicated. In order for the linear flow velocity from the output orifices 15 and 16 to be a maximum, they are located at radius of maximum signal for the lowest level of signals to be sensed whereby they receive the fluid of maximum rotational velocity from the chamber 5. The particular configuration of the output orifices 15 and 16 and the radial location of the same along the upper end wall 3 is of particular importance in obtaining the maximum amplification and efficiency from the system and should therefore be carefully determined in accordance with the particular results and characteristics desired. For a fuller discussion of these features which form no part of the present invention, reference is made to the aforesaid co-pending case which includes a more complete discussion of the design and location of the output orifices 15 and 16.

In accordance with the present invention, a centrally located relief orifice, generally indicated by the reference numeral 20, is provided in the lower wall 4 to improve the signal-to-noise ratio of the system, as previously indicated and now described in detail. As best illustrated in FIGURE 1, there exists in any vortex device a central core of fluid 21 which exhibits solid body rotation as previously mentioned, and the orifice 20 is positioned to remove the same from the system. A passage 22 is provided at the orifice 20 to convey the fluid 21 to another location, if desired.

As previously indicated, the position of the core 21 is unstable in the absence of the core bleed, orifice 20, thus introducing noise into the system. Also the inclusion of fluid exhibiting solid body rotation in the output signal seriously reduced the signal level due to averaging. In the specific system illustrated in FIGURE 1 and described in the aforesaid co-pending application, the effect of instability of the position of the core is even more serious since it does not divide between the orifices 15 and 16, but switches randomly between them introducing serious noise effects, at lower signal levels particularly.

Results and advantages of providing the centrally located relief orifice 20 in accordance with the present invention should now be apparent to those skilled in the art since the very important signal-to-noise ratio of the system is greatly enhanced in the two ways just described; that is, by increasing the actual output signal level of the system and by materially reducing the source of noise in the system related to movement of the core.

In FIGURE 2b, there is illustrated a graphical representation of conditions in the vortex chamber at minimum signal level desired to be detected. The graph is useful in selecting the proper size of the relief orifice 20 and the vortex chamber 5 to give maximum performance in accordance with the present invention. In this illustration, the ratio of the rotational velocity ($v$) at any point in the chamber 5 to the rotational velocity of the fluid adjacent the outer periphery of the chamber 5 ($v_o$) is seen to vary as a function of the ratio of the radial location ($r$) of the selected point to the radial extent of the chamber 5 ($R_o$). The locus of the maximum velocity ($V_{max}$) and its radial location ($r_{max}$) is determined by a line connecting the apex of each of the curves $R_{n1}$ and $R_{n2}$ representing different Reynolds numbers, as indicated by the line L.

Referring to the case where the Reynolds number is $R_{n1}$, as an example, with the proper design of the amplifier 1 illustrated in FIGURE 2b, it can be seen that the maximum rotational velocities occur just inside the relief orifice 20 at point A on the curve. To the left side of point A on curve $R_{n1}$, the unwanted solid body rotation of the core 21 exists and this flow is removed via the orifice 20, in accordance with the invention. On the right side of point A, free vortex flow exists and the portion of this flow in the region of outlet orifice 15 is utilized as the output signal. In the preferred embodiment, the output orifice 15 is positioned as close to the centerline of the amplifier as is practical without being in the region of high shear stresses that occur just to each side of $r_{max}$ (point A) where the free vortex flow changes to solid body rotation.

Figure 3:
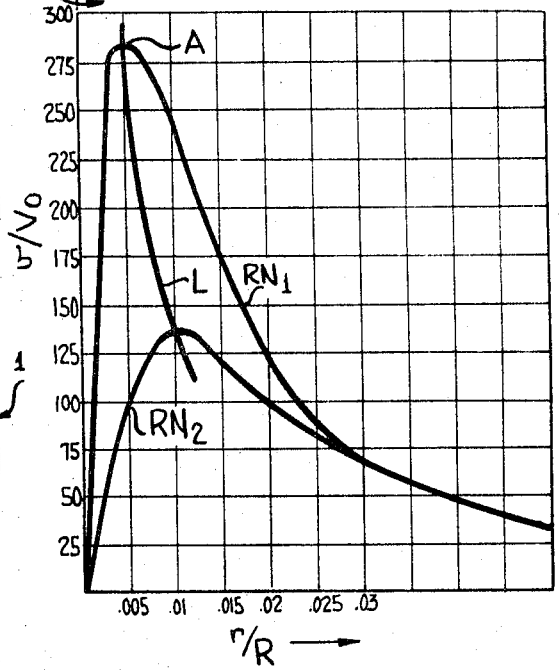
FIGURE 3 illustrates the output orifice region of another embodiment of the vortex device constructed in accordance with the present invention.
Figure 3:
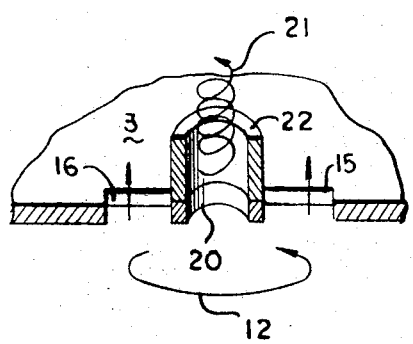

Referring now to FIGURE 3, alternative arrangement of the present invention is shown wherein like reference numerals refer to the corresponding elements as illustrated in FIGURE 1. In this arrangement, the relief orifice 20 is positioned in the center of the upper end plate 3 between the output orifices 15 and 16, and the nozzle 22 is or may be included in the arrangement to separate this solid body flow from the signal flow of the output orifices 15 and 16. The operation is essentially as before with the output flow egressing from the orifices 15 and 16 in accordance with the direction and strength of the rotating fluid mass in the chamber 5 while the forced vortex flow along the centerline of said chamber 5 is vented to the atmosphere or conveyed to a suitable sump, whereby the output signal from the orifices 15, 16 is increased and the noise level in the system is decreased for an improved signal-to-noise ratio in the system. One particular advantage of this embodiment lies in the fact that the total readout device, including the relief orifice 20, is compactly positioned along one end wall. Also, an advantage in increased signal level at the output orifices 15, 16 is realized due to the fact that the solid body rotation 21 and the free vortex rotational flow 12 are both traveling in the same axial direction. It should be noted here that the tube walls of the nozzle 22 are preferably as thin as possible so that the output orifices 15 and 16 are positioned as near to the higher velocities at the center of the chamber as possible without receiving undue feedback noise from the exiting solid body core 21.

The embodiment illustrated in FIGURE 4 likewise has elements which bear the same reference numerals as the embodiments shown in FIGURES 1 and 2, and in addition, there is provided an output chamber 25; the diameter of the chamber 25 being considerably less than the diameter of the vortex chamber 5 so that the angular velocity of the flow in said chamber 25 is amplified. The orifice 20 is positioned at the entrance of the chamber 25 and, as in the other embodiments, said orifice receives the solid body rotation along the axis of symmetry of the device, so that the signal-to-noise ratio is increased as before. In this embodiment, the signal-to-noise ratio is further increased, probably for the following reasons: When fluid flows around a sharp corner, such as at the orifices 15 and 16 of FIGURE 3, a Weir effect is produced resulting in some turbulence in the flow. The chamber 25 acts as a stilling chamber in that the vortical flow is maintained in the chamber and due to the depth of chamber 25, the turbulent flow is reduced prior to exit through orifices 15 and 16.

The apparatus of FIGURE 4 differs from that of FIGURE 3 in another respect. The wall 3 is provided with an annular opening 51 in which is located an annular concave member 52 secured to the circular section of the wall defining the inner circumference of the opening 51. The member 52 is concave outwardly toward the outer circumference of the chamber 5 so that fluid flowing adjacent the wall 3 is diverted from the chamber 5 and through the opening 51. The member 52 is secured to the outer section of wall 3 by an annular wall 53 through which extends a plurality of holes 54. The fluid passing through opening 51 thus flows through holes 54 and out of the system. An identical arrangement may be provided in the other end wall particularly if opposed readout devices are provided as illustrated in the aforesaid application, Ser. No. 301,868.

The reason for employing member 52 and its associated components is that, in vortex systems, a boundary layer of fluid is developed between the fluid and the plate or wall 3 which increases in thickness as the axis of the chamber is approached. The boundary layer fluid is of lesser velocity than the remaining fluid and reduces signal level again due to averaging. The utilization of the member 52 and its associated parts bleeds off a large portion of the boundary layer materially limiting its maximum thickness and thus reducing its signal averaging effect.

In the present preferred embodiment of the invention, the nozzle 22 extending from the relief orifice 20 is preferably formed in a wedge shape, as illustrated, for a particular reason. With this design, the orifice 20 is defined by the lower edge of the wedge-shaped nozzle 26 so that a finer degree of separation between the solid body rotation 21 and the free vortex rotation 12 can be made. This detailed separation gives increased output velocity for low signal levels at the output orifices 15, 16 since, as will be remembered, the highest velocity vortex flow 21 is in juxtaposition to the solid body core 21.

Referring now specifically to FIGURES 5–8 of the accompanying drawings, there are illustrated several adaptations of the device of the present invention to known pure fluid measuring devices of the type illustrated and described in the aforementioned co-pending application. The vortex amplifier 1 in these figures, contains like elements of FIGURES 1 and 2 and therefore bear the same reference numerals as these figures. There is illustrated a measuring or determining device 30 which is mated with the output orifices 15 and 16 and the relief orifice 20 for better definition of the output signal from said vortex amplifier 1. More particularly, if it is so desired, a continuous indication of direction and rate of rotation of the fluid output signals from the amplifier 1 is obtained through the two output tubes 31 and 32, as more particularly described in said aforementioned application. In essence, if it is assumed that the rotation of the fluid in the chamber 5 is along the counterclockwise path indicated by the reference numeral 12, the output flow exits through the output orifice 15 and thus is directed to the output tube 31, as indicated by the solid flow arrows in FIGURE 5. Conversely, when clockwise rotation occurs the output flow is directed to the output tube 32 in the same manner. If there is no rotational component to the flow in chamber 5 then the output flow will be directed upwardly through a central output passage 33 from the same output orifice 15. Vent channels 34 and 35 are provided to bleed excess fluid and to prevent boundary layer effects from influencing the direction of flow entering the measuring device 30 so that the direction is solely dependent upon the relative strength and direction of the output signals.

With specific reference to FIGURE 6, it can be seen that the output orifice 16 is equipped with a like measuring device 40 with corresponding output tubes 41 and 42 and center output passage 43. An inner layer 50 is provided between the measuring devices 30 and 40, said layer 50 providing an elongated aperture 51 for communication with the relief orifice 20 of the amplifier 1. In operation, still assuming that counterclockwise rotation 12 is present in the system, the output tube 42 of the measuring device 40 will receive the output flow from the output orifice 16 and the elongated aperture 51 will receive the solid body rotation from the center of the amplifier 1.

As illustrated in FIGURE 7, if desired, additional measuring devices 30', 40' may be provided along the lower end wall 4 as shown in the dotted line outline. Also, as shown in FIGURE 7, the output tubes 31, 42 and 32, 41 can be connected to another pure fluid amplifier, designated by the reference numeral 45. The amplifier 45 can serve to increase the output level of the output signals of the measuring device 30, 40 so as to be of the desired level for control of a utilization device 46. The amplifier 45 is or may be designed to utilize the boundary layer effects so that the power stream will flip between the output passages in response to the control signal from the measuring devices 30, 40 as is more completely described in the aforementioned co-pending application.

FIGURE 8 illustrates in a cross-sectional elevation view the manner in which the measuring devices 30, 40 are applied to the readout device of FIGURE 4. As indicated, the elongated aperture 51 communicates with the orifice 20 through the wedge-shaped nozzle 26 and the output orifices 15, 16 communicate with the corresponding output passages of the measuring devices 30 and 40 in the manner just described in conjunction with the embodiment illustrated in FIGURES 5 and 6.

In any of the foregoing embodiments, the result is the same, that is, the signal-to-noise ratio of the vortex amplifier 1 is increased as described so that the efficiency and thus the usefulness of the vortex amplifier as a signal amplifier and measuring device is enhanced. Essentially, this is accomplished by providing the centrally located relief orifice that not only stabilizes the position of the solid body rotation along the axis of symmetry of the device but also actually increases the velocity of the output signal flow at the asymmetrical signal orifice or orifices.

We claim:
1. In a pure fluid vortex amplifier having a substantially cylindrical sidewall and a pair of substantially circular end walls forming a vortex chamber about an axis of symmetry, means for introducing fluid into said chamber adjacent said cylindrical sidewall and means for creating vortical flow in said chamber having a center core of solid body flow, a fluid readout comprising at least one signal orifice formed in one of said end walls in a region of said vortical flow the axis of said signal orifice being radially offset from the center of said chamber, and a generally circular relief orifice formed in one of said end walls in the region of said solid body flow for removing same from said chamber.

2. The combination of claim 1, wherein said relief orifice is formed in the same end wall as said signal orifice and is in juxtaposition thereto.

3. The combination of claim 1, wherein is further provided a measuring device communicating with said signal orifice for determining the rate and direction of rotation of said vortical flow.

4. In a pure fluid vortex system having a substantially cylindrical sidewall and a pair of substantially circular end walls forming a vortex chamber about an axis of symmetry, means for introducing fluid into said chamber adjacent said cylindrical sidewall and means for creating vortical flow in said chamber having a center core of solid body flow, a fluid readout comprising an egress orifice of substantially lesser diameter than said vortex chamber and generally coaxial with said axis, a first fluid passage having its axis radially offset from said axis, said fluid passage communicating with said vortex chamber through said egress orifice, and a generally circular second fluid passage having an orifice coaxial with said axis and having a diameter less than the diameter of said egress orifice.

5. The combination according to claim 4 wherein said second fluid passage has a diameter approximately equal to the diameter of the core of fluid under minimum signal conditions.

6. The combination according to claim 4 wherein said second fluid passage is defined by a cylindrical wall tapered toward said orifice.

7. The combination according to claim 4 further comprising a third end wall enclosing an end of said first fluid passage remote from said egress orifice, and at least one signal orifice formed in said third end wall and displaced from said axis.

8. The combination according to claim 4 further comprising a third end wall enclosing an end of said first fluid passage remote from said egress orifice, at least two signal orifices formed in said third end wall and dispersed on opposite sides of said axis.

9. The combination according to claim 4 further comprising an annular opening formed in one of said end walls adjacent to and outwardly of said egress orifice and means for withdrawing from said vortex chamber fluid adjacent said one of said end walls.

10. In a pure fluid vortex amplifier having a substantially cylindrical sidewall and a pair of substantially circular end walls forming a vortex chamber about an axis of symmetry, a generally circular relief orifice extending through one of said end walls coaxial with said sidewall, means for introducing fluid into said chamber adjacent said cylindrical sidewall and means for creating vortical flow in said chamber having a center core of solid body flow coaxial with said relief orifice, a fluid readout comprising two signal orifices formed in one of said end walls and radially aligned on opposite sides of said relief orifice.

11. The combination according to claim 10 wherein said relief orifice is in one of said end walls and said signal orifices are in the other of said end walls.

12. A vortex amplifier having a pair of spaced generally flat walls, an annular wall between said flat walls and coxial therewith to define a vortex chamber and an egress orifice characterized by an annular fluid scoop extending into said chamber through one of said flat walls and directed toward said annular wall to remove a portion of the fluid flowing in said chamber adjacent said one of said flat walls.

References Cited

UNITED STATES PATENTS 3,182,675  5/1965  Zilberfarb et al. ----- 137—81.5
3,219,048  11/1965  Palmisano ---------- 137—81.5

SAMUEL FEINBERG, Primary Examiner